United States Patent [19]

Etzbach

[11] Patent Number: 4,721,779
[45] Date of Patent: Jan. 26, 1988

[54] TRISAZO DYES CONTAINING NAPHTHALENE OR QUINOLINE UNITS AND THEIR USE IN LIQUID CRYSTAL MATERIALS

[75] Inventor: Karl-Heinz Etzbach, Frankenthal, Fed. Rep. of Germany

[73] Assignee: BASF Aktiengesellschaft, Ludwigshafen, Fed. Rep. of Germany

[21] Appl. No.: 893,268

[22] Filed: Aug. 5, 1986

[30] Foreign Application Priority Data

Aug. 22, 1985 [DE] Fed. Rep. of Germany ....... 3529988

[51] Int. Cl.$^4$ ............... C09B 31/16; C09B 33/22; C09K 3/34; G02F 1/13
[52] U.S. Cl. ............... 534/577; 252/299.1; 350/349; 534/573; 534/754; 534/809; 534/831; 534/887
[58] Field of Search ............... 534/577, 754, 809

[56] References Cited

U.S. PATENT DOCUMENTS

| | | | |
|---|---|---|---|
| 3,941,560 | 3/1976 | Renfrew et al. | 534/577 X |
| 4,231,746 | 11/1980 | Dehnert et al. | 534/577 X |
| 4,308,161 | 12/1981 | Aftergut et al. | 534/577 X |
| 4,308,162 | 12/1981 | Cole et al. | 534/577 X |
| 4,308,163 | 12/1981 | Aftergut et al. | 534/577 X |
| 4,308,164 | 12/1981 | Aftergut et al. | 534/577 X |
| 4,359,398 | 11/1982 | Cole et al. | 534/577 X |
| 4,401,369 | 8/1983 | Jones | 534/577 X |
| 4,600,527 | 7/1986 | Imazeki et al. | 534/577 X |

*Primary Examiner*—Floyd D. Higel
*Attorney, Agent, or Firm*—Oblon, Fisher, Spivak, McClelland & Maier

[57] ABSTRACT

Trisazo compounds of the formula

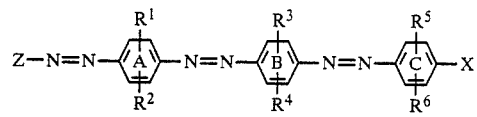

where Z is

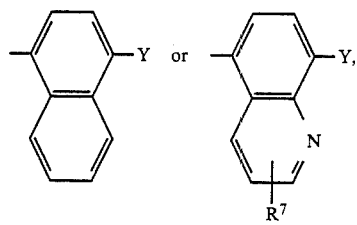

X and Y independently of one another are each $C_1$–$C_{24}$-alkoxy, benzyloxy, phenylethoxy, mono-$C_1$–$C_{24}$-alkylamino, monobenzylamino, monophenylethylamino, monophenylamino, bis-$C_1$–$C_{24}$-alkylamino, N-$C_1$–$C_{12}$-alkyl-N-benzylamino, N-$C_1$–$C_{12}$-alkyl-N-phenylethylamino or N-$C_1$–$C_{12}$-alkyl-N-phenylamino, where the benzene rings are unsubstituted or substituted by $C_1$–$C_{12}$-alkyl, cyclohexyl, 4-$C_1$–$C_{12}$-alkylcyclohexyl, $C_1$–$C_{24}$-alkoxy, phenoxy or $C_1$–$C_{24}$-alkanoyloxy, $R^1$, $R^2$, $R^3$, $R^4$, $R^5$ and $R^6$ independently of one another are each hydrogen, methyl, methoxy, or chlorine and $R^7$ is hydrogen or methyl, and the ring A or B may furthermore carry a fused benzene ring, are very useful as dyes in liquid crystal media, for example for electrooptical displays.

8 Claims, No Drawings

TRISAZO DYES CONTAINING NAPHTHALENE OR QUINOLINE UNITS AND THEIR USE IN LIQUID CRYSTAL MATERIALS

Liquid crystal materials which contain pleochroic dyes are used in displays. The principles of the use of dyes in liquid crystal materials are known and are described by, for example, H. Kelker and R. Hatz, Handbook of Liquid Crystals, (1980) 611 et seq, R. J. Cox, Mol. Cryst. Liq. Cryst. Vol. 55 (1979), 51 et seq., and L. Pauls and G. Schwarz, Elektronik 14 (1982), 66 et seq. Further references relating to the use of dyes in liquid crystal materials are cited elsewhere in the stated publications.

Dyes for liquid crystal mixtures must meet a number of requirements (see, for example, B. J. Constant et al., J. Phys. D: Appl. Phys. 11 (1978), 479 et seq., F. Jones and T. J. Reeve, Mol. Cryst. Liq. Cryst. 60 (1980) 99 et seq. and European Pat. Nos. 43,904, 55,838 and 65,869. They must not ionize in an electric field, must have a very high molar extinction coefficient $\epsilon$ and good solubility in the liquid crystal matrix used, must be chemically and, in particular, photochemically stable, and as far as possible must have a degree of order S greater than 0.75 in the particular nematic phase in order to achieve good contrast of the guest-host display.

Dyes which meet all these requirements belong predominantly to the anthraquinone class (see, for example, EP-A-56 492, EP-A-91 225, DE-A-30 28 593, EP-A-54 217 or DE-A-29 01 177).

As a rule, azo dyes known before now have the disadvantage that their light stability and/or their solubility do not meet the high requirements (see, for example, G. W. Gray, Chimia 34 (1980) 47 et seq.).

Symmetrical dichroic trisazo dyes having a high degree of order are known (see, for example, DE-A-31 25 183 or EP-A-54 837).

However, there continues to be a need to improve the degree of order, the solubility and the lightfastness of the dyes, in particular in the low-viscosity and increasingly nonpolar liquid crystal mixtures used today, e.g. ZLI 2452, ZLI 2585, ZLI 2806 or ZLI 2903 from Merck.

It is an object of the present invention to synthesize yellow and red trisazo dyes which possess good solubility and light stability coupled with a high degree of order in the commercial liquid crystal mixtures and which, together with a blue dye, permit the production of a black liquid crystal mixture.

We have found that this object is achieved by the novel trisazo compounds of the general formula I

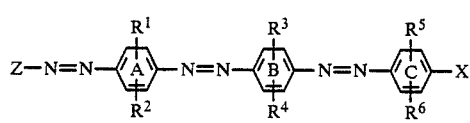

where Z is

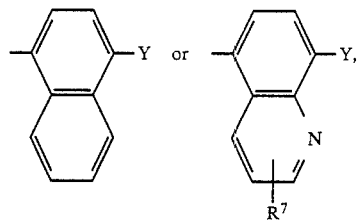

X and Y independently of one another are each $C_1-C_{24}$-alkoxy, benzyloxy, phenylethoxy, mono-$C_1-C_{24}$-alkylamino, benzylamino, monophenylethylamino, monophenylamino, bis-$C_1-C_{24}$-alkylamino, N-$C_1-C_{12}$-alkyl-N-benzylamino, N-$C_1-C_{12}$-alkyl-N-phenylethylamino or N-$C_1-C_{12}$-alkyl-N-phenylamino, where the benzene rings are unsubstituted or substituted by $C_1-C_{12}$-alkyl, cyclohexyl, 4-$C_1-C_{12}$-alkylcyclohexyl, $C_1-C_{24}$-alkoxy, phenoxy or $C_1-C_{24}$-alkanoyloxy, $R^1$, $R^2$, $R^3$, $R^4$, $R^5$ and $R^6$ independently of one another are each hydrogen, methyl, methoxy or chlorine and $R^7$ is hydrogen or methyl, and the ring A or B may furthermore carry a fused benzene ring.

In contrast to the trisazo dyes described in DE-A-31 25 183 or EP-A-54 837, the dyes according to the invention have an asymmetric structure. Surprisingly, we have found that the solubility and also the degree of order in commercial liquid crystals are substantially improved compared with the symmetrical dyes. Furthermore, the dyes possess excellent light stability in solution in liquid crystal mixtures.

Examples of preferred radicals X and Y are butoxy, pentyloxy, hexyloxy, heptyloxy, octyloxy, nonyloxy, dodecyloxy, benzyloxy, 4-($C_1-C_{12}$-alkyl)-benzyloxy, 4-cyclohexylbenzyloxy, 4-(4'-$C_1-C_{12}$-alkylcyclohexyl)-benzyloxy, 4-($C_1-C_{12}$-alkoxy)-benzyloxy, 4-($C_1-C_{24}$-alkanoyl)-benzyloxy, butylamino, pentylamino, hexylamino, heptylamino, octylamino, nonylamino, dodecylamino, methylheptylamino, methyloctylamino, methylnonylamino, methyldodecylamino, dioctylamino, didodecylamino, benzylamino, phenylethylamino, 4-($C_1-C_{12}$-alkyl)-benzylamino, 4-cyclohexylbenzylamino, 4-(4'-$C_1-C_{12}$-alkylcyclohexyl)-benzylamino, N-methyl-N-[4-($C_1-C_{12}$-alkyl)-benzyl]-amino, N-methyl-N-(4-cyclohexylbenzyl)-amino, N-methyl-N-[4'-$C_1-C_{12}$-alkylcyclohexyl)-benzyl]-amino, phenylamino, 4-($C_1-C_{12}$-alkyl)-phenylamino, N-methyl-N-phenylamino and N-methyl-N-[4-($C_1-C_{12}$-alkyl)-phenyl]-amino.

The compounds of the formula I can be prepared by diazotizing a compound of the formula $$NO_2 \overset{R^1}{\underset{R^2}{-A-}} N=N \overset{R^3}{\underset{R^4}{-B-}} NH_2$$

and reacting the product with a coupling component of the formula

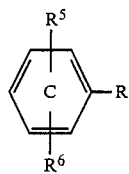

to give a compound of the formula II

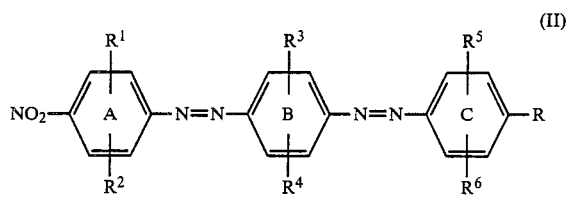

where R is hydroxyl or substituted amino an the other symbols having the meanings given above.

Where R is OH, the compounds of the formula II can be converted to the substituted hydroxy compounds by a conventional method.

The nitro compounds of the formula II can, for example, be reduced with sodium sulfide to give the corresponding amino compounds, which are then diazotized again and reacted with a coupling component of the formula

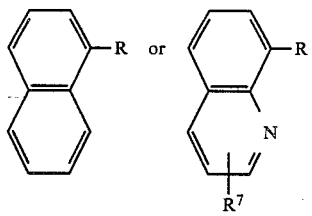

to give a compound of the formula I. The conversion of the compounds in which R is OH to the novel compounds containing substituted hydroxyl is in turn carried out by a conventional method.

The dyes can be purified by chromatography over silica gel using, for example, a toluene/ethyl acetate mixture or methylene chloride as the mobile phase. The dyes are then recrystallized, for example from toluene. The purity is preferably checked by thin layer chromatography, HPLC or elemental analysis.

Of particular importance are compounds of the formula Ia

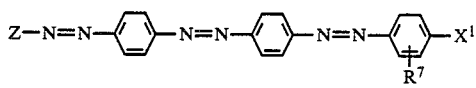

where Z and $R^7$ have the stated meanings and $X^1$ is substituted hydroxyl.

Z is preferably quinolylene or naphthylene which is substituted by monosubstituted amino or substituted hydroxyl.

A typical method of preparing the dyes of the formula I is described in Example 1 below. Parts and percentages are by weight, unless stated otherwise.

EXAMPLE 1

150 parts of a 23% strength sodium nitrite solution are first added to a mixture of 124 parts of 4-amino-4'-nitroazobenzene and 1000 parts of water at 5° C., followed by 50 parts of concentrated hydrochloric acid. The mixture is then stirred for 5 hours at 5° C., after which 5 parts of active carbon are added and the mixture is filtered. The filtrate is added to a solution of 54 parts of m-cresol, 20 parts of sodium hydroxide solution and 500 parts of water while cooling with ice, and the pH of the solution is kept at 7 by adding dilute sodium hydroxide solution. The mixture is stirred for a further hour at room temperature, after which the dye formed is filtered off under suction, washed with water and dried. 170 parts (94% of theory) of the bisazo dye of the formula

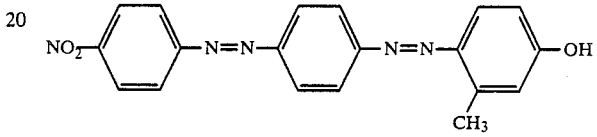

are obtained.

Melting point: 272° C.

A mixture of 54.2 parts of this bisazo dye, 29 parts of n-octyl bromide, 20.7 parts of potassium carbonate and 250 parts of dimethylformamide is stirred for 3 hours at 100° C., and the resulting precipitate is filtered off at room temperature, washed with a little dimethylformamide and then with water and dried. 41 parts (58% of theory) of the alkylated dye of the formula

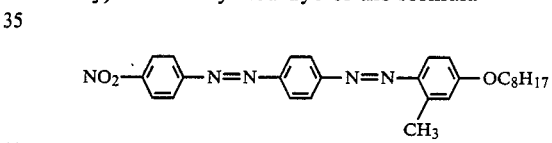

are obtained.

Melting point: 120° C.

35.6 parts of the alkylated bisazo dye in a mixture of 400 parts of water, 250 parts of toluene, 31.6 parts of sodium sulfide and 11 parts of ammonium chloride are heated at the boil for 5 hours. Thereafter, the toluene is distilled off from the mixture, 200 parts of methanol are added and the precipitate is filtered off under suction, washed with methanol and then with water and dried. 23 parts (69% of theory) of the amino compound of the formula

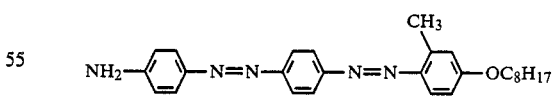

are obtained.

Melting point: 182° C.

5.6 parts of the amino compound are dissolved in 60 parts of dimethylformamide, and 3.8 parts of a 23% strength sodium nitrite solution are first added, followed by 3.1 parts of concentrated hydrochloric acid, the additions being made while cooling with ice. The mixture is then stirred for a further 5 hours at 5° C., and a solution of 2.1 parts of ethyl α-naphthylamine in 60 parts of tetrahydrofuran is added to the diazonium salt solution. The resulting precipitate is filtered off under suction, washed with tetrahydrofuran and then introduced into a mixture of 100 parts of methanol and 100 parts of concentrated sodium acetate solution. The mixture is stirred for a further hour at room temperature, and the precipitate which separates out is filtered off under suction and washed with water. 5 parts (64% of theory) of the crude dye of the formula are obtained.

The dye is purified by chromatography over silica gel (silica gel 60, 0.063–0.0200 mm, from Merck) using methylene chloride as the mobile phase, followed by recrystallization from toluene.

Melting point: 167° C.

The dyes listed below can be prepared in a similar manner.

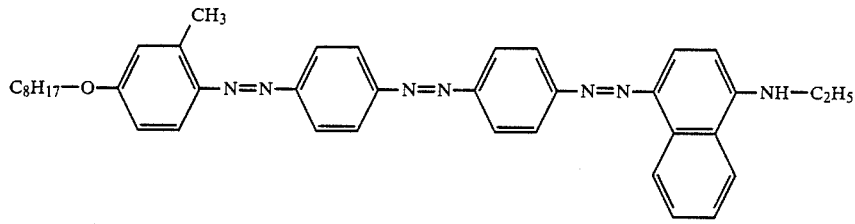

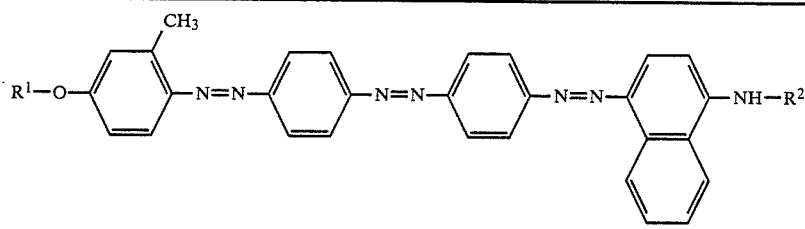

| Example | R¹ | R² |
|---|---|---|
| 1 | $C_8H_{17}$ | $C_2H_5$ |
| 2 | $C_8H_{17}$ | $C_8H_{17}$ |
| 3 | $C_2H_5$ | $C_8H_{17}$ |
| 4 | $C_7H_{15}$ | $C_{12}H_{25}$ |
| 5 | $C_7H_{15}$ | $-CH_2-CH_2-C_6H_5$ |
| 6 | $C_7H_{15}$ | $-C_6H_4-C_4H_9$ |

| Example | Dye |
|---|---|
| 7 | (structure with $C_8H_{17}-O$, CH₃, naphthyl groups, and $NH-C_{12}H_{25}$) |
| 8 | (structure with $C_8H_{17}-O$, CH₃, and $OCH_2-C_6H_4-C_5H_{11}$) |

-continued

9 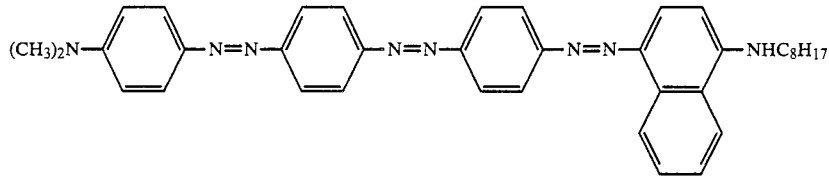

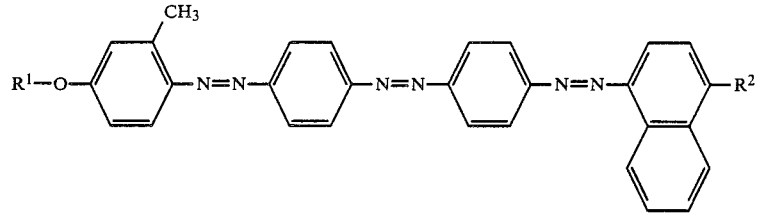

| Example | R¹ | R² |
|---|---|---|
| 10 | $C_{12}H_{25}$ | $NHC_2H_5$ |
| 11 | $C_{12}H_{25}$ | $NHC_{12}H_{25}$ |
| 12 | $C_8H_{17}$ | $NHC_{12}H_{25}$ |
| 13 | $C_{12}H_{25}$ | $OC_{12}H_{25}$ |
| 14 | $C_{12}H_{25}$ | $O-CH_2-C_6H_5$ |
| 15 | $C_{12}H_{25}$ | $OC_2H_5$ |
| 16 | $C_4H_9\text{-}CH(C_2H_5)\text{-}CH_2$ | $O-CH_2-C_6H_5$ |
| 17 | $C_{12}H_{25}$ | $N(CH_3)_2$ |

[Structure: $R^1-O-C_6H_3(CH_3)-N=N-C_6H_4-N=N-C_6H_4-N=N-$ quinoline with $NH-C_8H_{17}$ and $CH_3$ substituents]

| Example | R¹ |
|---|---|
| 18 | $C_8H_{17}$ |
| 19 | $C_{12}H_{25}$ |
| 20 | $C_4H_9\text{-}CH(C_2H_5)\text{-}CH_2$ |

Table 1 which follows summarizes, for Examples 1 to 20, the degree of order S measured at room temperature in ZLI 2452 from Merck, the solubility L determined in ZLI 2452, likewise at room temperature (for Examples 1–9 only), the melting point and the absorption maximum in methylene chloride.

The degree of order S was determined in accordance with the known equation $S=(CR-1)/(CR+2)$, in commercial measuring cells with a homogeneous orientation (polyimide). The dichroic ratio CR was determined by measuring the extinctions E″ (measurement with light polarized parallel to the preferred direction of the nematic phase) and E (measurement with light polarized at right angles to the preferred direction of the nematic phase) and using the relation $CR=E''/E$, the dye concentration being chosen so that E″ was from 1 to 2. The measurements were carried out in an Acta CIII spectrophotometer from Beckmann.

FIG. 1 shows the extinction E″ and E for the compound of Example 1 in ZLI 2452.

The solubility was determined as described below.

50 mg of the particular dye was stirred in 1 ml of the liquid crystal material for 1 week at room temperature, the saturated solution was removed from the residue by centrifuging, and the solubility was determined by comparison of the extinctions.

The light stability of the dyes in the particular liquid crystal material was determined by rapid exposure of the solution in the measuring cell in a Suntest apparatus (Hanau) at 25° C. The dyes exhibited very good photostability, particularly when a UV protective coating was used.

TABLE 1

| Example | Degree of order S (at RT) | Solubility L (at RT) | M.p. °C. | λmax. (CH$_2$Cl$_2$) |
|---|---|---|---|---|
| 1 | 0.84 | 2.1% | 167 | 532 nm |
| 2 | 0.84 | 0.8% | 154 | 534 nm |
| 3 | 0.81 | 0.4% | 170 | 534 nm |
| 4 | 0.83 | 1.2% | 136 | 533 nm |
| 5 | 0.81 | 0.9% | 193 | 528 nm |
| 6 | 0.78 | 2.9% | 141 | 528 nm |
| 7 | 0.81 | 1.0% | 138 | 553 nm |
| 8 | 0.83 | 1.2% | 158 | 442 nm |
| 9 | 0.81 | 1.0% | 187 | 537 nm |
| 10 | 0.82 | | 134 | 532 nm |
| 11 | 0.83 | | 158 | 530 nm |
| 12 | 0.82 | | 135 | 533 nm |
| 13 | 0.81 | | 161 | 443 nm |
| 14 | 0.82 | | 164 | 438 nm |
| 15 | 0.80 | | 163 | 440 nm |
| 16 | 0.80 | | 138 | 438 nm |
| 17 | 0.80 | | 156 | 483 nm |
| 18 | 0.83 | | 170 | 533 nm |
| 19 | 0.83 | | 162 | 535 nm |
| 20 | 0.81 | | 124 | 532 nm |

I claim:

1. An asymmetric trisazo compound of the formula

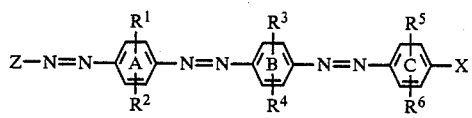

where Z is

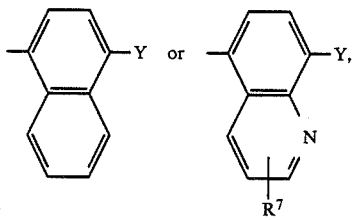

X and Y independently of one another are each C$_1$–C$_{24}$-alkoxy, benzyloxy, phenylethoxy, mono-C$_1$–C$_{24}$-alkylamino, monobenzylamino, monophenylethylamino, monophenylamino, bis-C$_1$–C$_{24}$-alkylamino, N-C$_1$–C$_{12}$-alkyl-N-benzylamino, N-C$_1$–C$_{12}$-alkyl-N-phenylethylamino or N-C$_1$–C$_{12}$-alkyl-N-phenylamino, where the benzene rings are unsubstituted or substituted by C$_1$–C$_{12}$-alkyl, cyclohexyl, 4-C$_1$–C$_{12}$-alkylcyclohexyl, C$_1$–C$_{24}$-alkoxy, phenoxy or C$_1$–C$_{24}$-alkanoyloxy, R$^1$, R$^2$, R$^3$, R$^4$, R$^5$ and R$^6$ independently of one another are each hydrogen, methyl, methoxy or chlorine and R$^7$ is hydrogen or methyl, and each of the rings A or B is a single ring or has fused thereto a benzene ring.

2. A trisazo compound as claimed in claim 1, wherein Z is

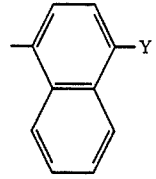

3. A trisazo compound as claimed in claim 1, wherein R$^1$, R$^2$, R$^3$ and R$^4$ are each hydrogen.

4. A trisazo compound as claimed in claim 1, wherein R$^5$ is hydrogen and R$^6$ methyl.

5. A trisazo compound as claimed in claim 1, wherein Y is mono-C$_1$–C$_{24}$-alkylamino, monobenzylamino, monophenylethylamino, monophenylamino, bis-C$_1$–C$_{24}$-alkylamino, N-C$_1$–C$_{12}$-alkyl-N-benzylamino, N-C$_1$–C$_{12}$-alkyl-N-phenylethylamino or N-C$_1$–C$_{12}$-alkyl-N-phenylamino and X is C$_1$–C$_{24}$-alkoxy, benzyloxy or phenylethoxy, where in each case the benzene rings are unsubstituted or substituted by C$_1$–C$_{12}$-alkyl, cyclohexyl, 4-C$_1$–C$_{12}$-alkylcyclohexyl, C$_1$–C$_{24}$-alkoxy, phenoxy or C$_1$–C$_{24}$-alkanoyloxy.

6. A trisazo compound as claimed in claim 1, wherein Y is mono-C$_1$–C$_{24}$-alkylamino, monobenzylamino, monophenylethylamino or monophenylamino and X is bis-C$_1$–C$_{24}$-alkylamino, N-C$_1$–C$_{12}$-alkyl-N-benzylamino, N-C$_1$–C$_{12}$-alkyl-N-phenylethylamino, N-C$_1$–C$_{12}$-alkyl-N-phenylamino, C$_1$–C$_{24}$-alkoxy, benzyloxy or phenylethoxy, where in each case the benzene rings are unsubstituted or substituted by C$_1$–C$_{12}$-alkyl, cyclohexyl, 4-C$_1$–C$_{12}$-alkylcyclohexyl, C$_1$–C$_{24}$-alkoxy, phenoxy or C$_1$–C$_{24}$-alkanoyloxy.

7. A trisazo compound as claimed in claim 1, wherein X and Y independently of one another are each C$_1$–C$_{24}$-alkoxy, benzyloxy or phenylethoxy.

8. A trisazo compound as claimed in claim 1, of the formula

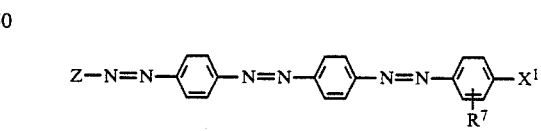

where Z and R$^7$ have the given meanings and X$^1$ is C$_1$–C$_{24}$-alkoxy, benzyloxy or phenylethoxy.

* * * * *